Nov. 28, 1939. W. R. KENT 2,181,373
SELF-CONTROLLED VARIABLE SPEED MECHANISM
Filed Feb. 11, 1938
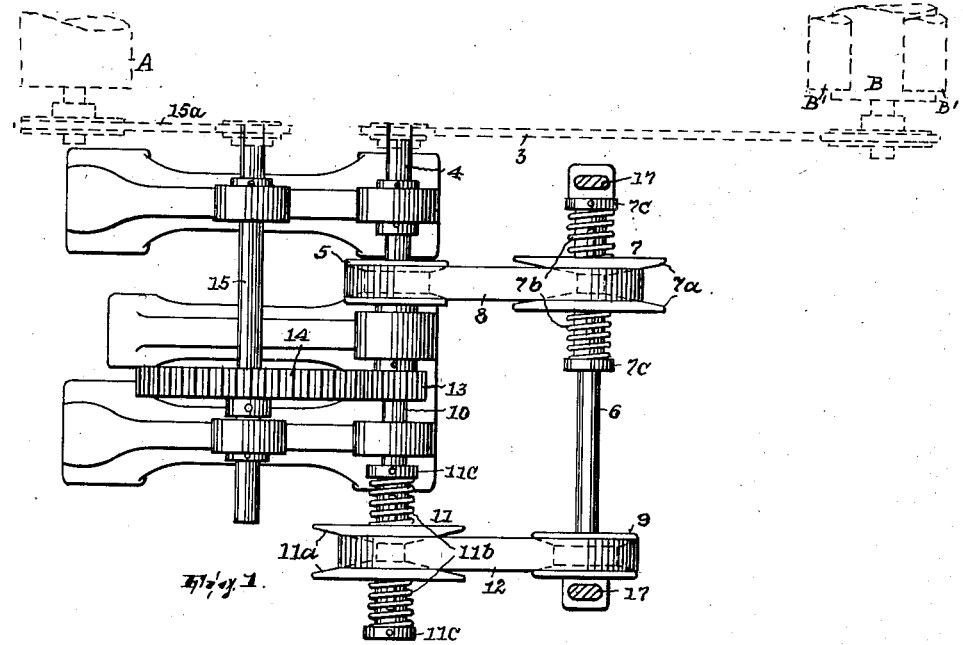
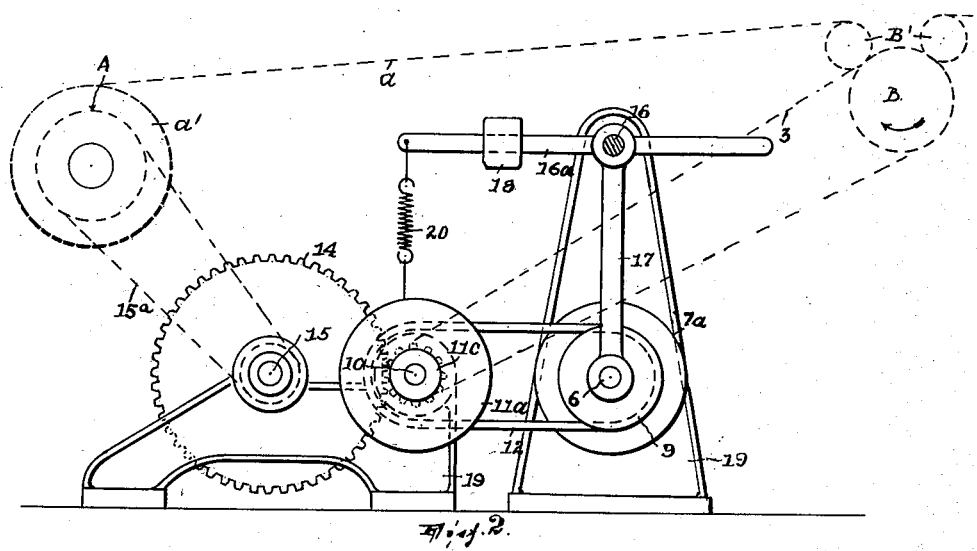
INVENTOR,
William R. Kent,
BY
ATTORNEY.

Patented Nov. 28, 1939

2,181,373

UNITED STATES PATENT OFFICE 2,181,373

SELF-CONTROLLED VARIABLE SPEED MECHANISM

William R. Kent, Passaic, N. J.

Application February 11, 1938, Serial No. 189,921

9 Claims. (Cl. 242—75)

When a sheet or other length of flexible material is spirally wound under tension and extending from one to the other of rotary members on one of which as a core it is formed in a wound mass and the other of which rotates and delivers said length at constant speed the necessary change in the peripheral speed of the first member has heretofore been effected by manual adjustment and from time to time. According to this invention such change is effected automatically and gradually.

Given mechanism for initially holding the length to be treated at a given tension and including a train of intergeared rotary parts having the terminal parts thereof respectively constituting a member forming a core on which said length may be wound and a member for delivering such length to the first member at substantially constant speed, said train having adjoining parts thereof held bearing against each other with substantially constant pressure and forming the elements of a friction-drive, the invention contemplates that one such element shall be shiftable relatively to the other in the direction to reduce the speed of the driven relatively to that of the driving one of said elements and free so to be shifted by the torque of the wound mass when the train is driven in the direction to cause the second-named member to deliver such length. Thus the change in peripheral speed of the wound mass in inverse ratio to its change in diameter will be a factor in maintaining constant the tension of said length during the winding.

But calculation will show that in order to attain actual constancy of tension in such a case the increasing torque of the wound mass has to be taken into account—that is to say, the tendency, as the winding proceeds, of the increasing torque to increase the tension on what may be regarded as the intergeared system formed by said train and length, and hence on such length. Hence my invention contemplates means, engaged with the shiftable element, to oppose to the torque a force increasing as the torque increases.

The invention is herein disclosed by reference to one practical example but of course is susceptible of embodiment in divers other forms.

In the drawing,

Fig. 1 is a plan of the mechanism with the wound-mass core and the means to advance the length $a$ being treated shown by broken lines in Fig. 2; and Fig. 2 is a side elevation of what is shown in Fig. 1, with said length and the wound mass $a'$ thereof shown by broken lines.

In both views a certain hanger appears in section.

Let A be the rotary core on which, non-rotative relatively thereto, is the wound mass $a'$ of the length $a$ to be treated, and B be a roll rotated at constant speed and adapted to deliver said length (assumed to be initially held at a given tension by A and B) at constant speed, such length being kept in non-slipping relation to roll B, as by freely rotative idler rolls B' coacting with roll B to compress the length between them.

By sprocket-and-chain means 3 a shaft 4 is rotated from the roll B, this shaft having a fixed pulley 5 having adjoining conical faces. Parallel with shaft 4 is a shaft 6 having a twin-pulley 7 driven from pulley 5 through an endless flexible friction-drive element or belt 8; twin-pulley 7 comprises two friction-drive elements in the form of reverse cone-pulleys 7a each splined to the shaft and they being urged together by springs 7b abutting collars 7c affixed to shaft 6. Shaft 6 has a fixed pulley 9 to drive a shaft 10 alined with shaft 4, shaft 10 having a twin-pulley 11 around which and pulley 9 extends an endless flexible friction-drive element or belt 12; twin-pulley 11 comprises two friction-drive elements in the form of reverse cone-pulleys 11a each splined to the shaft 10 and they being urged together by springs 11b abutting collars 11c affixed to such shaft. Shaft 10 through gearing 13—14 drives a shaft 15, and this is geared with and drives the roll or core A through a sprocket-and-chain connection 15a. Shaft 6 is journaled in a hanger comprising a shaft 16 and pendants 17 and having a lateral arm 16a equipped with a longitudinally adjustable weight 18. Parts of the fixed structure in which the rolls A and B, the shafts and the hanger have bearings are shown at 19.

The train of intergeared parts comprises B, 3, 4—5, 8, 7—6—9, 12, 11—10—13, 14—15, 15a and A. The friction-drive may here be regarded as afforded by either belt and one of the corresponding pulleys 7a and 11a, and the elements thereof exist bearing with substantially constant pressure against each other here by a mechanical expedient, or by virtue of the corresponding springs 7b and 11b and the weight 18, which are assumed to counterbalance each other at all times as nearly as possible.

As for the one friction-drive, it is either pulley 7a, and as for the other friction-drive, it is the belt 12, which is the element shiftable relatively to the complementary element in the direction to reduce the speed of the driven relatively to the driving one of said elements and shifted in said direction by the torque of the wound mass.

Disregarding the spring 20 for the meanwhile, the operation is as follows: When the system is driven in the direction to deliver said length from B to A, with consequent increase in diameter and hence in torque of the wound mass, such torque represents a force which tends constantly to cause each belt to pull together the pulleys connected thereby, wherefore, the pulleys 7 and 9 being mounted to yield toward the complementary pulleys, the belts climb or creep toward the perimeters of the pulley 7 and 11, whereby the peripheral speed of the wound mass is changed in inverse ratio to its change in diameter. In short, the peripheral speed of the wound mass reduces at the same rate that its diameter increases and this gradual reduction in such speed is a material factor toward maintenance of a constant tension.

But the tendency of the increasing torque of the wound mass to increase the tension of the entire system and hence said length has to be taken into account. That is, the pull of the belts, while resulting in a decrease of speed, will nevertheless be greater, with consequently greater tension on the system and hence on said length, at the end of the winding than at the beginning. This is compensated for by the means here constituted by the spring 20 which is selected with a view as nearly as possible to increase at the same rate as the torque, being made to act where it will be effective for that purpose, to wit, on the hanger.

Said spring 20 also of course subserves the further function of keeping the hanger and its rotating load constantly up to its work, notwithstanding casual conditions tending to disturb the otherwise uniform tractive engagement between the belts and pulleys that would obtain.

Having thus fully described my invention what I claim is:

1. Mechanism for initially holding a flexible length under a given tension and thereupon winding said length including a train of intergeared rotary parts having the terminal parts thereof respectively constituting a member forming a core on which said length may be wound and a member for delivering such length to the first member at substantially constant speed, said train having adjoining parts thereof held bearing against each other at substantially constant pressure and forming the elements of a friction-drive, one such element being free to be shifted relatively to the other element in the direction to reduce the speed of the driven relatively to that of the driving one of said elements when the train is driven in the direction to cause the second-named member so to deliver such length, and being so free to be shifted by a force originating as torque of the wound mass and transmitted to said element wholly within the train.

2. The mechanism set forth in claim 1 characterized by said elements being a pulley presenting a lateral face and a belt extending around the axis of the pulley.

3. Mechanism for initially holding a flexible length under a given tension and thereupon winding said length including a train of intergeared rotary parts having the terminal parts thereof respectively constituting a member forming a core on which said length may be wound and a member for delivering such length to the first member at substantially constant speed, said train having adjoining parts thereof held bearing against each other at substantially constant pressure and forming the elements of a friction-drive, one such element being free to be shifted relatively to the other element in the direction to reduce the speed of the driven relatively to that of the driving one of said elements when the train is driven in the direction to cause the second-named member so to deliver such length, and being so free to be shifted by a force originating as torque of the wound mass and transmitted to said element wholly within the train, and means, engaged with the shiftable element, opposing to said force a force increasing as such torque increases.

4. The mechanism set forth in claim 3 characterized by said elements being a pulley presenting a lateral face and a belt extending around the axis of the pulley.

5. Mechanism for interconnecting for rotation together a rotary core on which to wind the length to be wound and a rotary delivery element for said length including fixed structure, a structure supported by the fixed structure and freely shiftable laterally, a member rotative in the fixed structure and having a fixed pulley, a member rotative in the movable structure with its axis parallel with that of the first-named member and having a fixed pulley, a pair of pulleys splined on the second-named member and having opposed conical faces, an endless belt extending around the axes of and engaged with the first-named pulley and the pair of pulleys, another rotary member journaled in the fixed structure, a pair of pulleys splined to the third-named member and having opposed conical faces, an endless belt extending around the axes of and engaged with the second-named fixed pulley and the second-named pair of pulleys, and means to urge the pulleys of each pair of pulleys together, said movable structure including means normally urging the same from the first-named and third-named members.

6. The mechanism set forth in claim 5 characterized by means engaged with the second-named member to oppose to the torque of the wound mass a force increasing as such torque increases.

7. Mechanism for initially holding a flexible length under a given tension and thereupon advancing it in one direction of its length including a train of rotary intergeared parts having the terminal parts thereof respectively constituting a wound-mass core member and a member for delivering such length at substantially constant speed, said train having adjoining parts thereof held bearing against each other at substantially constant pressure and forming the elements of a friction-drive and having one such element free to be shifted relatively to the other in the direction to change their speed-ratio when the train is driven to advance said length in said direction and being so free to be shifted by a force originating as torque of the wound mass and transmitted to said element wholly within the train.

8. In combination, a rotary core member, a rotary delivery member for a flexible length in part forming a wound mass on the core member, a train of rotary intergeared parts having terminal parts thereof geared with said members, respectively, the system including said members and train forming means to initially hold said length under a given tension and said train having adjoining ones of said parts respectively constituting belt and pulley elements, movable means supporting one of said elements, and means, independent of the first means, supporting all of the other parts of said train, said movable means being normally urged to a given position and free to be shifted therefrom crosswise of the axis of the pulley element when said system is driven to advance said length in one direction and being so free to be shifted by a force originating as torque of the wound mass and transmitted to said element wholly within the system.

9. Mechanism for initially holding a flexible length under a given tension and thereupon advancing it in one direction of its length including a train of rotary intergeared parts having the terminal parts thereof respectively constituting a wound-mass core member and a member for delivering such length at substantially constant speed, said train having adjoining parts thereof held bearing against each other at substantially constant pressure and forming the elements of a friction-drive and having one such element free to be shifted relatively to the other element in the direction to change their speed-ratio when the train is driven to advance said length in said direction and being so free to be shifted by a force originating as torque of the wound mass and transmitted to said element wholly within the train, and means, engaged with the shiftable element, opposing to the torque a force varying as such torque varies.

WILLIAM R. KENT.